APPARATUS FOR FILLING MOLDED COOKIES

Filed March 16, 1970 5 Sheets-Sheet 1

INVENTOR
CHARLES R. WERNER
BY
Price, Heneveld, Huizenga & Cooper
ATTORNEYS

June 13, 1972 C. R. WERNER 3,669,587

APPARATUS FOR FILLING MOLDED COOKIES

Filed March 16, 1970 5 Sheets-Sheet 2

INVENTOR
CHARLES R. WERNER

BY
Price, Heneveld, Huizenga & Cooper
ATTORNEYS

APPARATUS FOR FILLING MOLDED COOKIES

Filed March 16, 1970 5 Sheets-Sheet 3

INVENTOR

CHARLES R. WERNER

BY

Price, Heneveld, Huizenga & Cooper

ATTORNEYS

APPARATUS FOR FILLING MOLDED COOKIES

Filed March 16, 1970 5 Sheets-Sheet 4

INVENTOR
CHARLES R. WERNER

BY

Price, Heneveld, Huizenga & Cooper
ATTORNEYS

APPARATUS FOR FILLING MOLDED COOKIES

Filed March 16, 1970 5 Sheets-Sheet 5

INVENTOR
CHARLES R. WERNER

BY
Price, Heneveld, Huizenga & Cooper
ATTORNEYS

United States Patent Office 3,669,587
Patented June 13, 1972

1

3,669,587
APPARATUS FOR FILLING MOLDED COOKIES
Charles R. Werner, Grand Rapids, Mich., assignor to Werner Lehara, Inc., Grand Rapids, Mich.
Filed Mar. 16, 1970, Ser. No. 19,966
Int. Cl. A21c *00/00;* A23g *3/00*
U.S. Cl. 425—112 23 Claims

ABSTRACT OF THE DISCLOSURE

An apparatus and process for making filled, molded cookies, the apparatus combining a depositing hopper and nozzle, and a folding apparatus, with an embossing die roller. The combination is made possible by inverting means for inverting the embossed patty prior to the depositing of the filling, so that the depositing occurs on the bottom of the cookie patty. The inverting means is preferably a belt adapted to grip the bottom of the patties so as to carry them with the pattern side down and then deposit them on a second belt for the filling and folding operations.

BACKGROUND OF THE INVENTION

In making filled cookies, it is conventional to provide apparatus which will deposit a filling upon a cookie patty surface and thereafter fold the edges of the cookie patty over the filling prior to the cookie being baked in an oven. The folding step and apparatus for accomplishing the same has heretofore prevented such filled cookies from having a pattern embossed thereon, inasmuch as the filling would be deposited upon and the edges folded over the surface which represents the embossed surface of the cookie. That is, the surface which is formed by the recess of the die and which is capable of thereby being embossed is conventionally the surface upon which the filling or topping would be placed and over which the edges of the cookie would be folded. Some attempts have been made to emboss the cookie patty after it has been filled, to overcome the above-stated problems, but these generally result in a ruptured cookie out of which the filling leaks. A further complication arises from the fact that until baked, the cookie patty is very fragile and the pattern embossed thereon is subject to being destroyed by only the slightest pressure exerted on the cookie patty.

Accordingly, it will be apparent that heretofore no successful apparatus has been provided for making filled embossed cookies. Nevertheless, it has been desired to produce such cookies, inasmuch as the molding of a pattern upon a filled cookie not only enhances the attractiveness of the cookie but permits source identification through the use of a trademark or the like on each individual item.

Still another problem in the cookie-making art is that of providing apparatus which is readily changeable to other operations, so as not to be merely a special purpose machine limited to making, for example, filled molded cookies.

SUMMARY OF THE INVENTION

This invention relates to an apparatus and a process for providing molded or embossed cookies formed with the filling therein. Specifically, the invention provides an improvement in a cookie molding machine utilizing a die, the recess of which is embossed to form the patterns on the top of the cookies molded therein, and means for conveying the molded cookies from the die. The improvement in this machine comprises the use of an inverting means for inverting the molded cookies so as to place the cookies on the conveying means with the embossed

2 patterns down, means for depositing foodstuff on the bottom of the conveyed molded cookies, and means for folding the bottom of each of the molded cookies upon itself over the deposited filling. This invention provides additionally a novel process for forming cookies of the type described.

Accordingly, it is an object of the invention to provide an apparatus and process for forming filled molded cookies wherein the embossing occurs prior to the filling of the cookie.

It is a related object of the invention to provide a means for inverting the molded or embossed cookie prior to the filling thereof so as to not affect the pattern embossed on the top of the cookie.

It is another object of the invention to provide an apparatus and process of the above character which is capable of use in conventional processing situations and, thus, is not completely a "special purpose" machine.

Other objects and advantages will become apparent upon reference to the following drawings and detailed discussion.

DESCRIPTION OF THE PREFERRED EMBODIMENT

Figure 1:
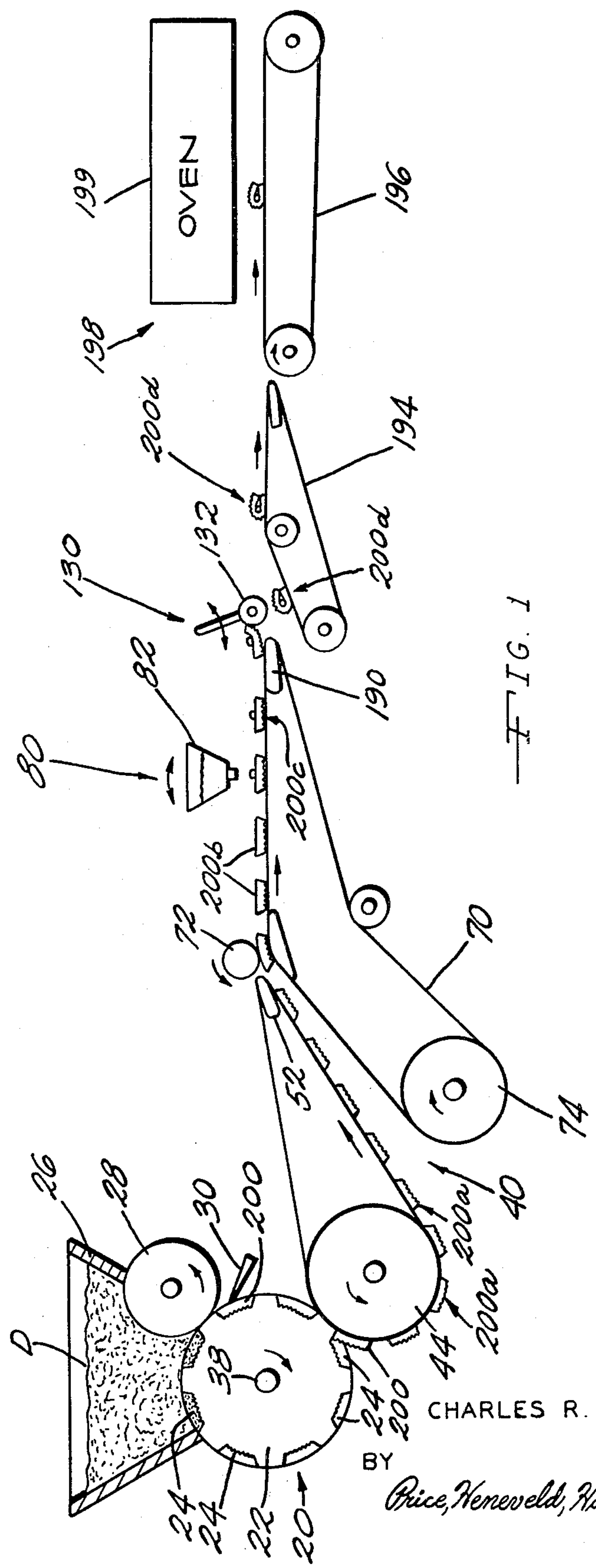
FIG. 1 is a schematic side elevational view of the device constructed in accordance with the invention.
Figure 2:
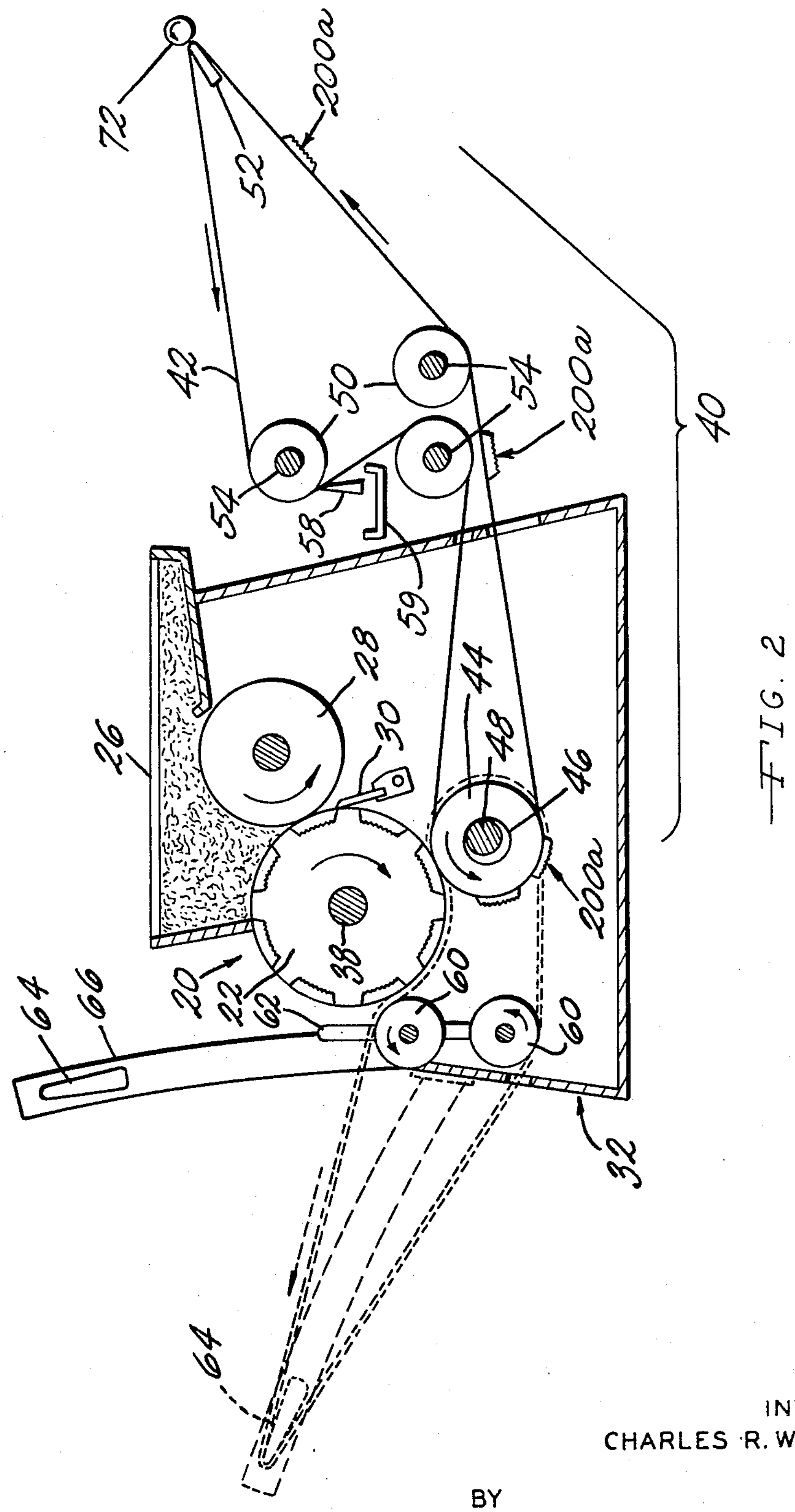
FIG. 2 is a partially schematic elevational view, partly in section, illustrating a portion of the device shown in FIG. 1.

There is illustrated broadly in FIG. 1 a cookie molding station 20 having a continuously rotating die roller, an inverting station 40, a depositing station 80, a folding station 130, and a baking station 198. An endless belt 70 conveys the molded or embossed cookie patties generally designated by numeral 200 from the inverting station 40 through the depositing station 80 to the folding station 130. An additional belt 194 may be used to convey the folded and filled cookie patties to the vicinity of the baking station 198. It should be noted that the components utilized in the molding station 20, the depositing station 80, the folding station 130, and the baking station 198 are more or less conventional as will be readily appreciated by those skilled in the art.

Molding station

Referring now to FIGS. 1 through 4, the cookie patties are formed and molded or embossed in station 20 by means of a continuously rotating die roller 22 having die segments the recesses of which are embossed with a pattern 24. The dough D is fed to the die roller by a hopper 26 and by a press roller 28. A scraper blade 30 conventionally levels off the molded cookie patties 200. The die roller 22 and the press roller 28 are mounted in a frame 32 which utilizes rollers 31 (FIG. 3) for conveniently moving the molding station in and out of position. A motor 33 conventionally drives the rollers of the molding station by a chain 34 which engages a socket 35 mounted on the end of the shaft of the press roller 28, a gear 36 adjacent to the sprocket 35 driving a gear 37 mounted on the end of the shaft 38 of the die roller 22.

It will be thus apparent that at the molding station 20, cookie patties are molded and embossed with a pattern on one side thereof continuously and conventionally by means of the die roller 22.

Inverting station

In accordance with one aspect of the invention, the inverting station 40 is utilized to invert the cookie patties after their formation in the die roller by reversing the direction of travel of the cookie patty after it emerges from the die roll. Referring to FIGS. 1 through 4, an endless belt 42 is pressed into contact with the die roller 22 by means of a rubber roller 44, so as to firmly engage the cookie patties 200 in the die segments. The pressure of the roller 44 causes suction, which forces the patties to stick to the belt 42. By the phrase "reversing the direction" of the cookie patties, it is meant that the belt 42 is brought around after contacting the cookie patties 200 and the die segments so that the direction of travel of the cookie patties 200 now on the belt 42 is reversed from a direction of right to left in FIG. 2 as the cookie patties are first contacted by the belt 42, to a direction of from left to right in FIG. 2. Such is conveniently done by bringing the belt around roller 44. By this arrangement, the cookie patties are now conveyed with the pattern side down, the bottom surface of the cookie patties strongly adhering to the belt 42. To designate this inverted mode of the cookie patties, the distinguishing suffix *a* has been added to the numeral 200 for the cookie patties. As used here and throughout the description, "up" and "down" refer to orientations obtained during use of the machine.

To especially adapt the belt 42 to carry the cookie patties with the pattern side down, the belt 42 is made of a material such as canvas, or any other material which has a surface attraction for dough products which is as great as that of canvas. For example, cotton belts are also usable. As the belt 42 is used in a continuous run, the dough attraction properties of the belt are enhanced by the formation of a dough film on the belt which remains thereon. Prior to the formation of this film, the attraction properties of the belt 42 can be enhanced by wetting down the belt.

So as to adjust the pressure exerted by the roller 44 against the die segments and the cookie patties therein, roller 44 is concentrically mounted upon a stationary shaft 46 (FIG. 2) by roller bearings (not shown), shaft 46 then being necked down to an eccentric mounting end 48 which passes through the frame 32. It will be readily apparent that as the end 48 is rotated within the frame 32, the roller 44 either advances toward or away from the die roller 22.

Figure 3:
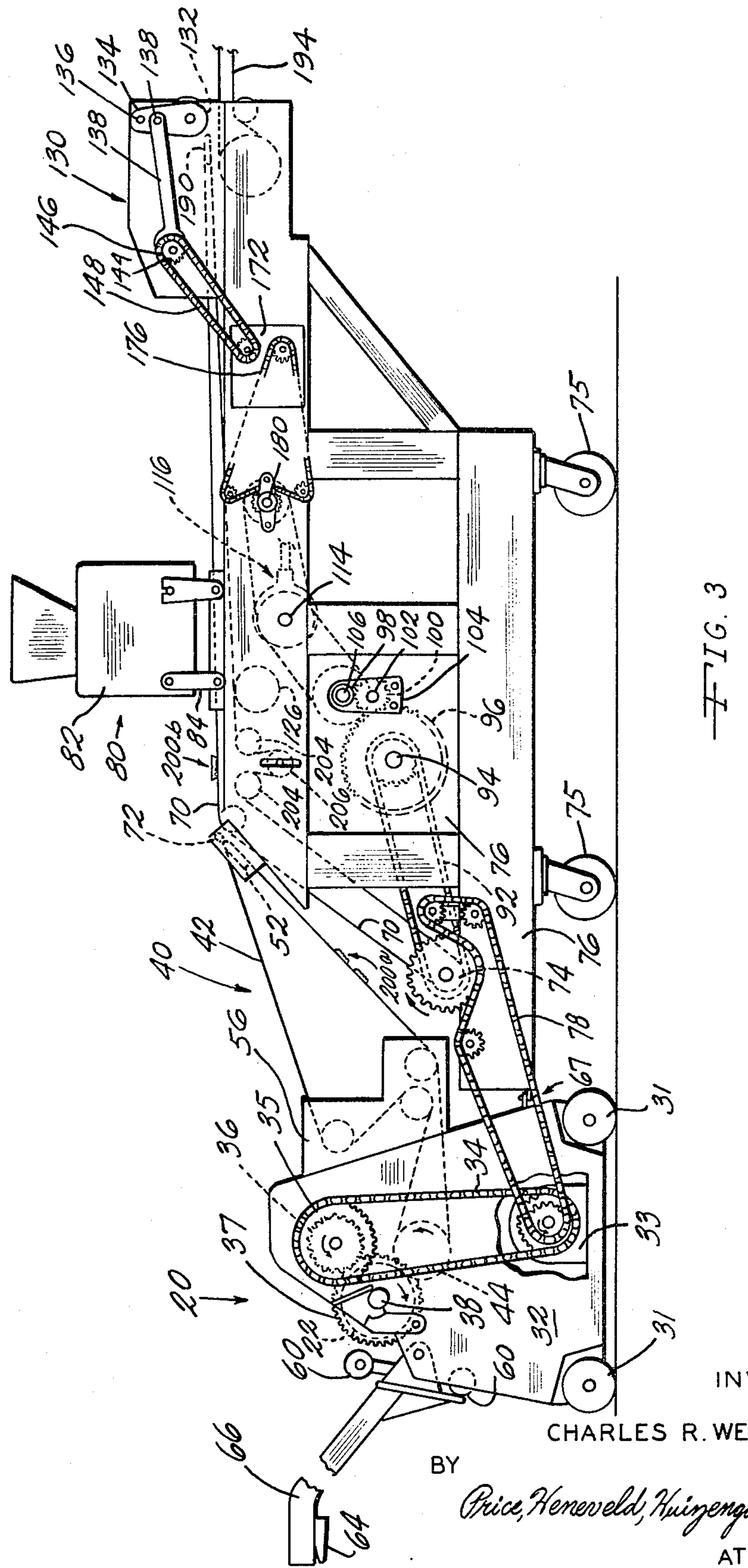
FIG. 3 is a fragmentary, partially schematic side elevational view taken from the same side as depicted in FIGS. 1 and 2, illustrating the drive train for the apparatus.
Figure 4:
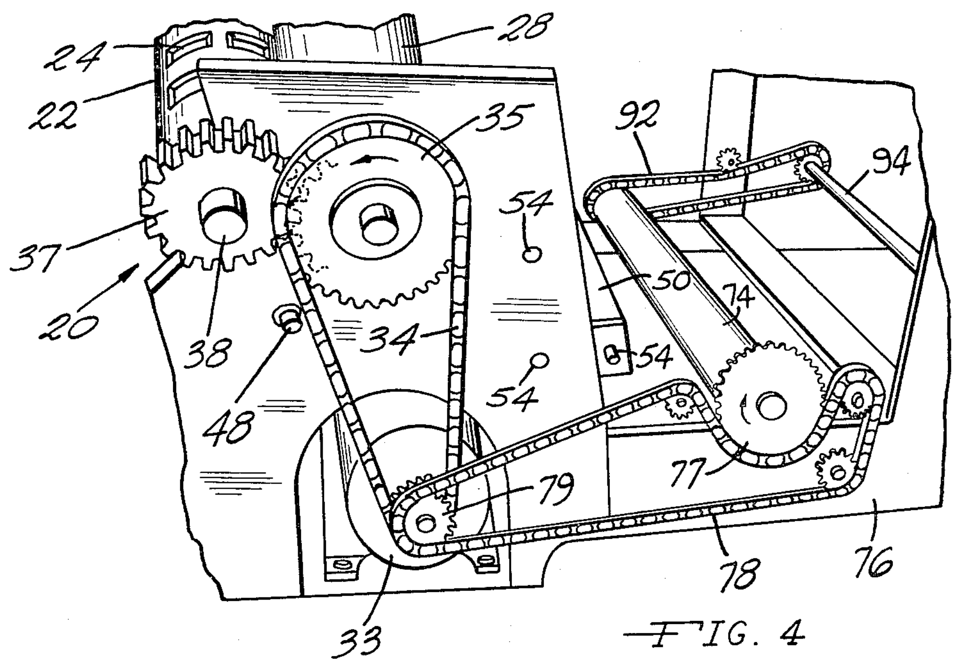
FIGS. 4 through 7 are fragmentary perspective views, with parts such as the belts omitted, illustrating in sequence the details of the drive depicted in FIG. 3.
Figure 7:
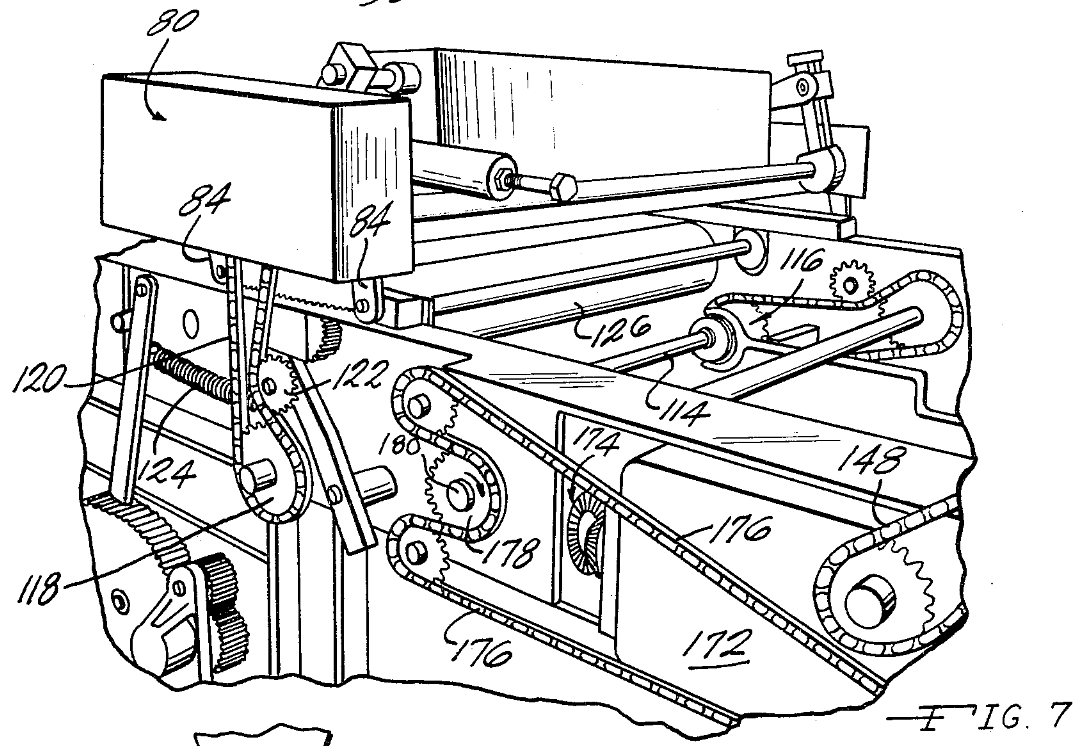

The remainder of the support for the belt 42 comprises idler rollers 50 and a nosing bar 52, which performs a function hereinafter described. The idler rollers 50 are mounted on shafts 54 which are journaled either in the frame 32 or in a bracket 56 mounted thereon (FIGS. 3 and 4).

To remove all but the aforesaid film of dough on the belt 42 prior to its re-entry into contact with the cookie patties, a scraper blade 58 (FIG. 2) is positioned below the uppermost idler rollers 50. A conventional trough 59 collects the removed segments of dough products which adhered to the belt 42.

In accordance with another aspect of the invention, the belt 42 is removably mounted on the idler rollers 50, the nosing bar 52, and the rubber roller 44, and can be alternately positioned (FIG. 2) in a more conventional mode so as to carry cookie patties with the pattern side up, this mode being utilized if no filling or folding operations are desired. To this end, idler rolls 60 are adjustably positioned on a bar 62 in the frame 32, the adjustment being utilized to allow more or less engagement by the belt 42 with the surface of the die roller 22. In the conventional mode for the belt 42, indicated in dotted lines in FIG. 2, a nosing bar 64 must be provided to assist in the removal of the cookie patties from the belt 42. By these means, the patties are deposited on a second belt (not shown), to be carried through other operations with the pattern side up. To make the apparatus convertible from the inverting mode to the conventional mode, the nosing bar 64 is mounted on a pivot arm 66 which pivots on the frame 32. A hitch 67 (FIG. 3) is utilized to attach the frame 32 to successive stations with the apparatus positioned in the inverting mode, the hitch being disconnected and the frame 32 turned around if the conventional mode and nosing bar 64 are to be utilized. By this construction, the apparatus of the invention is no longer a special purpose machine but can be utilized either in the "inverting" mode or the "conventional" mode, the pattern side of the cookie patties being carried upward in this latter mode.

To assist in removing the inverted cookie patties 200*a* from the belt 42 while operating in the inverting mode, and place them with the pattern side down on the conveying belt 70, the nosing bar 52 is positioned so as to bend the belt 42 therearound at a small acute angle. A constantly rotating take-off rod 72 is positioned immediately adjacent the belt to further assist in the removal of the inverted cookie patties, the direction of rotation of the take-off rod being counter to that of the belt 42 at the point where the rod and the belt are adjacent. To designate the inverted cookie patty as it is placed on the belt 70, the distinguishing suffix *b* has been utilized.

Having been placed upon the conveying belt 70, the cookie patties 200*b* are conveyed to the depositing station as hereinafter described. The belt 70 is driven by a roller 74 journaled to a frame 76 mounted on wheels 75, the belt being driven by a sprocket 77. The sprocket 77 is in turn driven by a chain 78 (FIG. 4) which is driven by a sprocket 79 mounted on the drive shaft of the motor 33. Conventional means such as idler rollers and a guiding surface are utilized to convey the belt 70 to the various stations, as hereinafter described in more detail.

Depositing station

Figure 8:
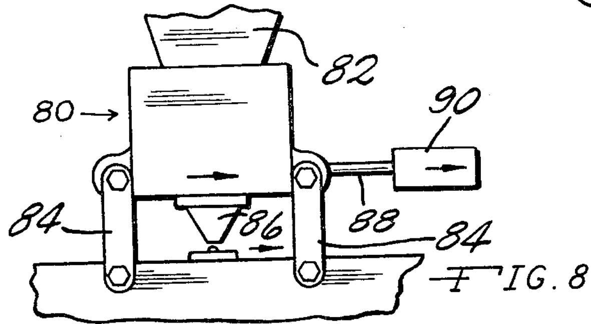
FIG. 8 is a partially schematic, fragmentary elevational view of the depositing apparatus.
Figure 5:
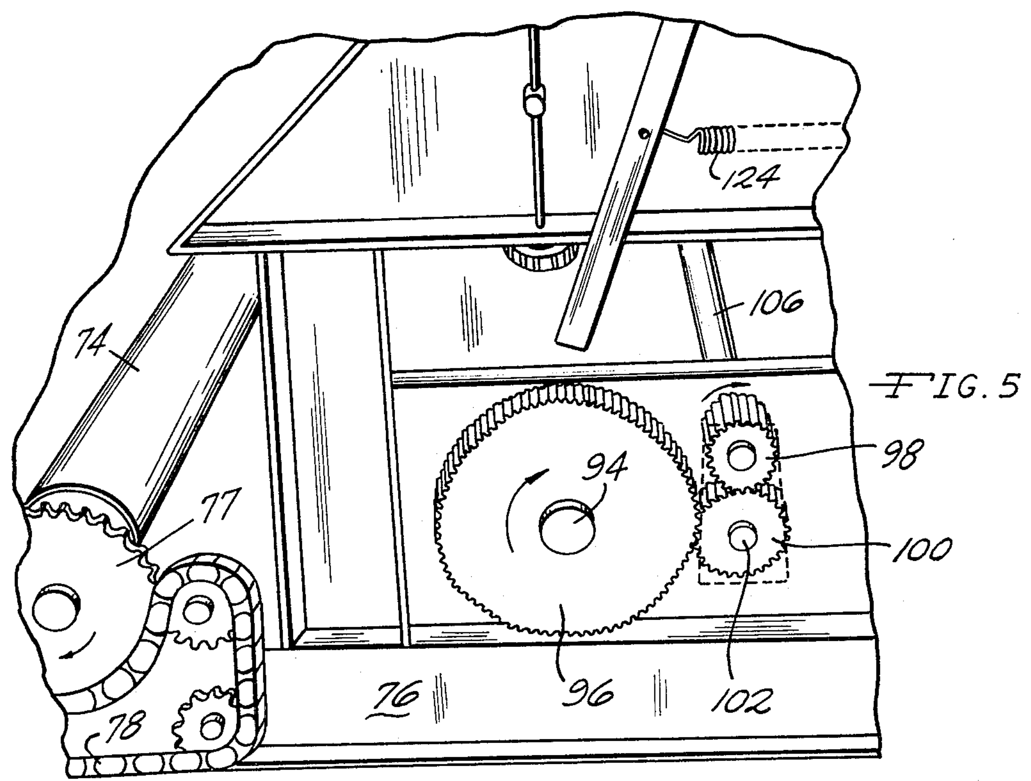
Figure 6:
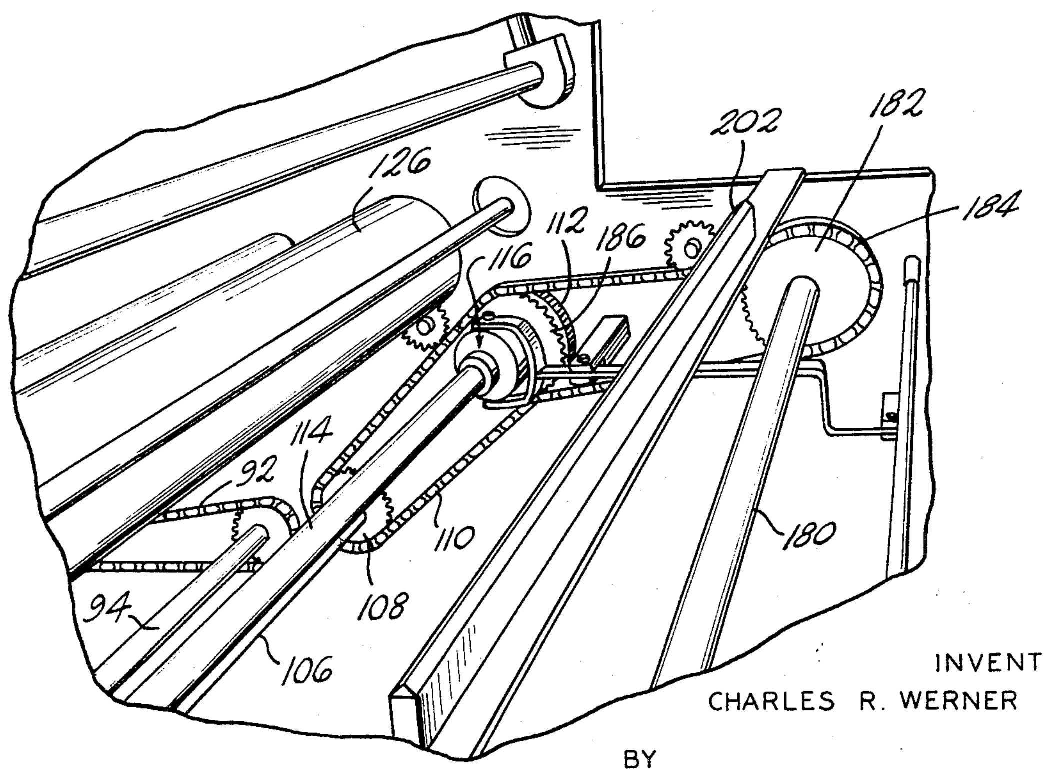

Referring now to FIGS. 3, 5, 6, 7 and 8, the belt 70 carries the cookie patties 200*b* to the depositing station 80, which station comprises a conventional hopper 82 mounted on rocker arm 84 for an oscillating motion above the belt 70. Pistons (not shown) cause the foodstuff such as filling or topping to be ejected from a nozzle 86 in timed sequence (FIG. 8). If the patty is to be folded later, the foodstuff is generally a filling, and if not, it may be a topping such as candy. The reciprocation of the arms 84 is conventionally controlled such as by a piston rod 88 activated within a cylinder 90. A conventional variable drive can be included to vary the speed of actuation of the topper so as to account for a minor change in the speed of belt 70.

The actual drive for the topping or depositing apparatus is shown in FIGS. 3 through 7. A chain 92 is mounted on a sprocket at the end of the roller 74 opposite to the sprocket 77, driving a jack shaft 94 thereby. Mounted at the end of the shaft 94 is a gear 96 which drives a smaller gear 98 in a stepped up ratio by means of an idler gear 100. The idler gear 100 is mounted on a stub axle 102 journaled to a pivotable plate 104 (FIG. 3) and shown in dashed lines in FIG. 5) which plate is bolted to the frame 76 in the desired position and which pivots about the shaft 106 upon which the gear 98 is mounted. The purpose of this arrangement is hereinafter stated. The opposite end of the shaft 106 mounts a sprocket 108 (FIG. 6) which drives a chain 110. The chain 110 drives still another sprocket 112 which sprocket engages a shaft 114 through a clutch 116 when the clutch is engaged. Mounted on the other end of the shaft 114 is a sprocket 118 (FIG. 7), which by means of a chain 120 activates the depositing or topping apparatus so as to eject material in a stepped, timed sequence out the nozzle 86. An idler sprocket 122 is spring biased against the chain by a spring 124 so as to take up the slack in the chain 120, the chain being otherwise slack so as to accommodate the oscillating motion of the depositing apparatus upon rocker arms 84.

The indirect drive provided by the gears 96 and 98 is utilized instead of a direct drive so as to allow a different gear ratio to be installed by replacing gear 96 with a different gear. The function of the plate 104 is to allow the idler gear 100 to be moved into the correct gear engagement with the new gear, the pivotal moving of the plate 104 being necessary because of the different sized gear replacing gear 96. The different gear ratio is utilized to account for the fact that, to make different size or type molded cookies, it is necessary to alter the cycle in which cookies are formed by the die roller and therefore appear on the belt 70. Such a distinct difference in cycling of cookie patties is more economically adjusted for by altering the gear ratios of gears 96 and 98 rather than by adjusting a variable speed drive on the depositing apparatus.

Because it is necessary to raise the belt 70 closer to the nozzle 86 during the actual ejection of material from the depositing apparatus, a roller 126 (FIG. 3) reciprocates upwardly and downwardly by a rocker arm (not shown) in timed sequence with the ejection of the material from the nozzle. The roller 126 presses against both the cookie patty bearing portion of the belt 70 as well as the returning portion of the belt, it being found that the oppositely moving portions of the belt 70 can slide over each other without damage to the belt.

It will thus be apparent that by means of the depositing station 80, jelly or some other type of filling is deposited upon the bottom of the cookie patty, the patty so deposited being designated with the distinguishing suffix *c*. Thus, the patty 200*c* moves away from the depositing station 80 with the filling properly positioned on the bottom of the patty so as to be ready for the folding station 130.

Folding station

After leaving the depositing station 80, the cookie patty 200*c* enters the folding station 130 (FIG. 1) wherein a portion of the bottom or unembossed side of each of the embossed patties is folded over itself and upon the filling deposited there at the station 80. By "folding a portion of the bottom or unembossed side of each of the patties over itself," it is meant folding it over in such a way as to form an enclosed cavity with the filling therein, the pattern side of the patty thus being positioned on the outside of the folded patty. As disclosed herein, the folding is accomplished by folding the patty in half, but any fractional fold which covers up the filling is suitable even if it is not limited to a half fold.

The apparatus for folding the cookie is conventional, and comprises (FIGS. 1 and 3) a roller 132 mounted on a pendulum arm 134 pivotally mounted on a shaft 136 in the frame. The arm 134 is periodically reciprocated outwardly and inwardly by a reciprocating coupling rod 138, the other end of which is eccentrically mounted on a shaft 144 which also mounts a sprocket 146 driven by a chain 148.

A nosing bar 190 is utilized in conjunction with the roller 132, the belt 70 being brought around the bar at a small acute angle so as to cause the patty as it is folded to drop down off the belt 70.

Thereafter, the folded and filled, molded cookie patty 200, bearing the distinguishing suffix *d* is conveyed (FIG. 1) either directly or by still another belt 194 to a point at which it is picked up by a steel belt 196 and carried into a subsequent station for further processing. As shown, this station is the baking station 198 which utilizes a conventional oven 199. However, if freezing rather than baking were desired, then a freezer must be used.

The belt 70, after dropping the cookie patty in its folded form onto the belt 194, is returned through the frame 76 over a scraper bar 202 (FIG. 6), idler rollers 204 (FIG. 3), and adjusting roller 206. As indicated earlier, the returning portion of the belt 70 is also raised and lowered by the roller 126 as it passes under its forward proceeding portion.

Operation

In the formation of the embossed, filled and folded cookie patty, the dough D is embossed and molded within the die roller 22 and, when operating in the inverted mode, the cookie patties are taken off by the belt 42 and inverted so as to be carried with the pattern side down to the nosing bar 52. The acute angle of bend of the belt 42, and the take-off rod 72 cause the patty, which is still soft and fragile, to be transferred to the belt 70. The belt 70 carries the molded patty under the depositing apparatus 82 where a filling is gently placed on the bottom of the patty, the pattern side of the patty resting on the belt 70. The belt carries the patty with the filling thereon to the nosing bar 190, where the roller 132 is rotated and reciprocated away from and back toward the belt 70 as the patties drop off the bar 190, so as to fold the filled patties. The folded patties then gently drop to belt 194 which conveys them to further operations such as baking.

Although only a single column of cookie patties is depicted in the sequence of operations, it will be appreciated that a plurality of columns proceed together one row at a time through each operation, inasmuch as the die roller repeatedly leaves a row of cookie patties on the belt 42 as it rotates through the length of a die segment. (See FIG. 4.)

Although the invention has been disclosed in connection with the production of folded, filled molded cookies, it will be apparent that it is usable on any dough product which requires a differentiation between the top and bottom surfaces of the product, and either an inversion of the top and bottom surface or an operation performed on the bottom surface in such a way as to not disturb the top surface. Otherwise, it is not necessary that the apparatus include the filling station, the folding station, or even the oven if the dough product being made does not require the property being provided by that particular station. Accordingly, it is intended that the invention cover all equivalent structure or embodiments in addition to the disclosed embodiment, which perform in substantially the same manner to obtain the same results, so as to come within the scope of the invention as defined by the following claims.

The embodiments of the invention in which an exclusive property or privilege is claimed are defined as follows.

1. In a cookie molding apparatus utilizing a die roller having an embossing pattern in the recess of the die segments of the roller for the continuous production of embossed cookie patties, and first means for conveying the embossed patties away from said roller; the improvement comprising said conveying means including an endless belt and means for pressing said belt against said roller, said belt being adapted to grip the bottom of the embossed patties; and means mounting said belt so as to reverse its direction after leaving said die roller to thereby orient and carry said patties with the pattern side of the patties down.

2. The improved molding apparatus as defined in claim 1, and further including means for removably mounting said belt in either of two positions, one of which provides said mounting wherein said belt reverses its direction upon leaving said roller, the other of which continues to convey said belt in the same general direction so as to carry the patties with the pattern side up.

3. The improved molding apparatus as defined in claim 1, wherein said belt is formed from a material having a surface attraction for dough products which is as great as that of canvas.

4. The improved molding apparatus as defined in claim 1, and further including removing means for removing the embossed patties from said belt while said belt is traveling in said reversed direction with said pattern side down.

5. The improved molding apparatus as defined in claim 4, wherein said removing means includes a take-off rod positioned adjacent to said belt.

6. The improved molding apparatus as defined in claim 5, wherein said rod rotates counter to the direction of movement of the belt at the point where said rod and said belt are adjacent.

7. The improved molding apparatus as defined in claim 4, wherein said removing means includes a nosing bar around which said belt is moved at a small acute angle.

8. The improved molding apparatus as defined in claim 4, and further including second means for continuously conveying the patties away from said removing means with the pattern side down.

9. The improved molding apparatus as defined in claim 8, and further including means for depositing filling on the bottom of the patties while conveyed by said second conveying means.

10. The improved molding apparatus as defined in claim 9, and further including folding means for folding a portion of the bottom of each of the embossed patties over itself and upon the deposited filling.

11. In a dough molding and embossing apparatus having a die which embosses patterns on one side of dough products formed therewith, and means for conveying molded, embossed dough products formed by said die to subsequent processing stations; the improvement comprising: inverting means for inverting the dough products so as to place said products on said conveying means with said one side contacting said conveying means and with the other side thereof exposed, said inverting means including an endless belt, said belt being especially adapted to grip said other side of the products and to carry said products with the pattern side down.

12. The improved molding apparatus as defined in claim 11, and further including means for removably mounting said belt in either of two positions, in one of which said belt deposits the products on said conveying means with the pattern side down, in the other of which said belt deposits the products on said conveying means with the pattern side up.

13. The improved molding apparatus as defined in claim 12, wherein said belt in said one position conveys the products pattern side down, and in said other position it carries them pattern side up, prior to depositing them on said conveying means.

14. The improved molding apparatus as defined in claim 11, wherein said belt is formed from a material having a surface attraction for dough products which is as great as that of canvas.

15. The improved molding apparatus as defined in claim 11, wherein said inverting means further includes means for transferring the inverted products from said belt onto said conveying means.

16. The improved molding apparatus as defined in claim 15, wherein said transferring means includes a rotating take-off rod positioned adjacent to said belt, said rod rotating counter to the direction of movement of the belt at the point where said rod and said belt are adjacent.

17. The improved molding apparatus as defined in claim 15, wherein said transferring means includes a nosing bar around which said belt is moved at a small acute angle.

18. The improved molding apparatus as defined in claim 11, and further including means for depositing foodstuff on the said other side of the conveyed molded products.

19. The improved molding apparatus as defined in claim 18, and further including folding means for folding a portion of the said other side of each of the molded products over itself and upon the deposited filling.

20. A machine for making filled molded dough particles comprising means for embossing individual dough patties with a pattern on one side thereof; means for depositing filling on the other side thereof; and, means for folding a portion of said other side over itself and upon the filling.

21. In a dough molding and embossing apparatus having a die which embosses patterns on one side of dough products formed therewith and first conveying means movable relative to said die for conveying the embossed dough products away from said die for further processing, the improvement comprising: second conveying means positioned adjacent said first conveying means; means for transferring said embossed dough products from said first conveying means onto said second conveying means such that the other side of said products are exposed whereby the non-embossed sides of said products may have subsequent processing operations performed thereon.

22. In a cookie molding apparatus utilizing a die roller having an embossing pattern in the recess of the die segments of the roller for the continuous production of embossed cookie patties, and means for conveying the embossed patties away from said roller; the improvement comprising said conveying means including a first endless belt and means for pressing said belt against said roller, said belt being mounted so as to reverse its direction after leaving said die roller so as to carry the embossed patties with the pattern side down, said belt being especially adapted to carry cookie patties with the pattern side down by adhering to the unembossed side of the patties; means for removably mounting said belt in either of two positions, one of which provides said mounting wherein said belt reverses its direction upon leaving said roller, the other of which conveys said belt in the same general direction so as to carry the patties with the pattern side up; means for pushing said patties off said belt with said pattern side down and onto a second endless belt; means for depositing filling on the unembossed side of the patties while conveyed by said second belt; and folding means for folding a portion of the unembossed side of each of the embossed patties over itself and upon the deposited filling.

23. In a dough molding and embossing apparatus having a die which embosses patterns on one side of dough products formed therewith, and means for conveying molded, embossed dough products formed by said die to subsequent processing stations; the improvement comprising: second conveying means adjacent said first mentioned conveying means; and inverting means for inverting the embossed dough products so as to orient said products on said second conveying means with said embossed patterns down.

References Cited

UNITED STATES PATENTS

| | | | |
|---|---|---|---|
| 2,950,693 | 8/1960 | Filiti et al. | 107—4 A |
| 2,700,939 | 2/1955 | Liston | 107—1 R |
| 3,379,139 | 4/1968 | Lipinsky | 107—1 R |

PATRICK D. LAWSON, Primary Examiner